No. 852,253. PATENTED APR. 30, 1907.
L. V. BENÉT & H. A. MERCIÉ.
SEMI-AUTOMATIC GUN.
APPLICATION FILED DEC. 29, 1906.
4 SHEETS—SHEET 3.
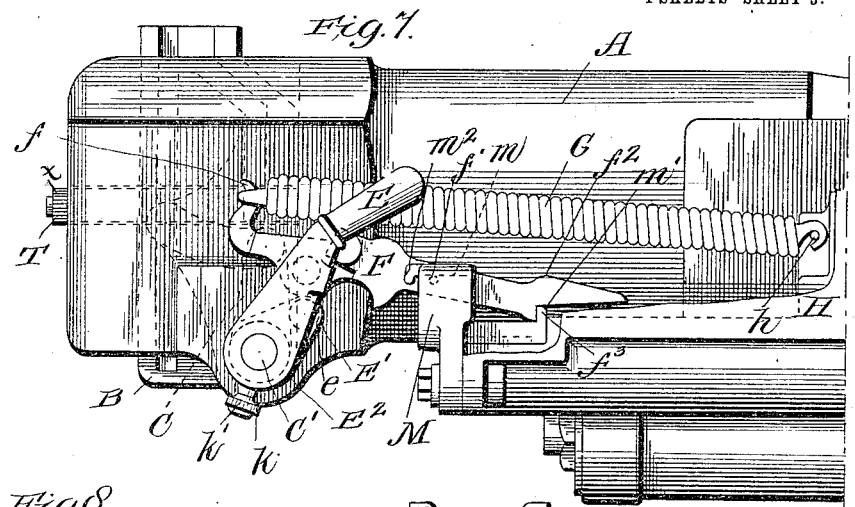
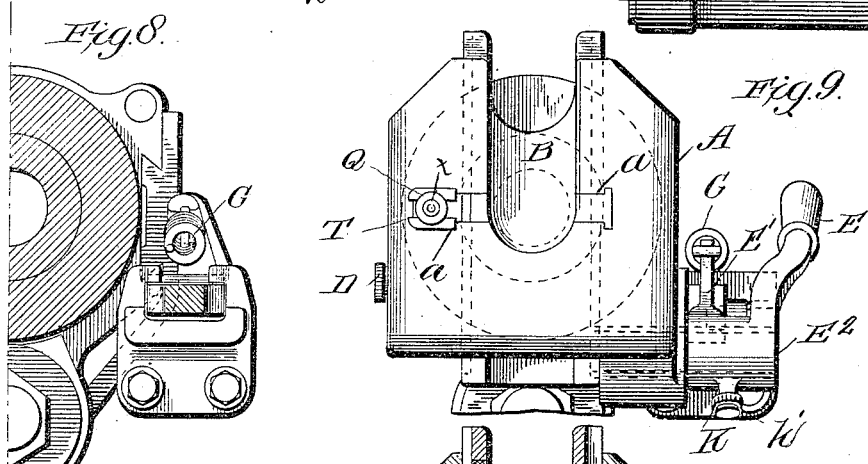
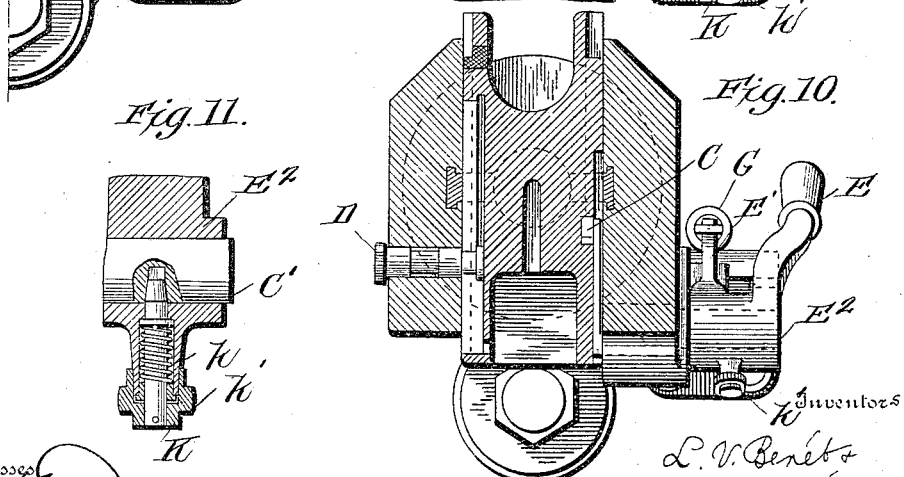

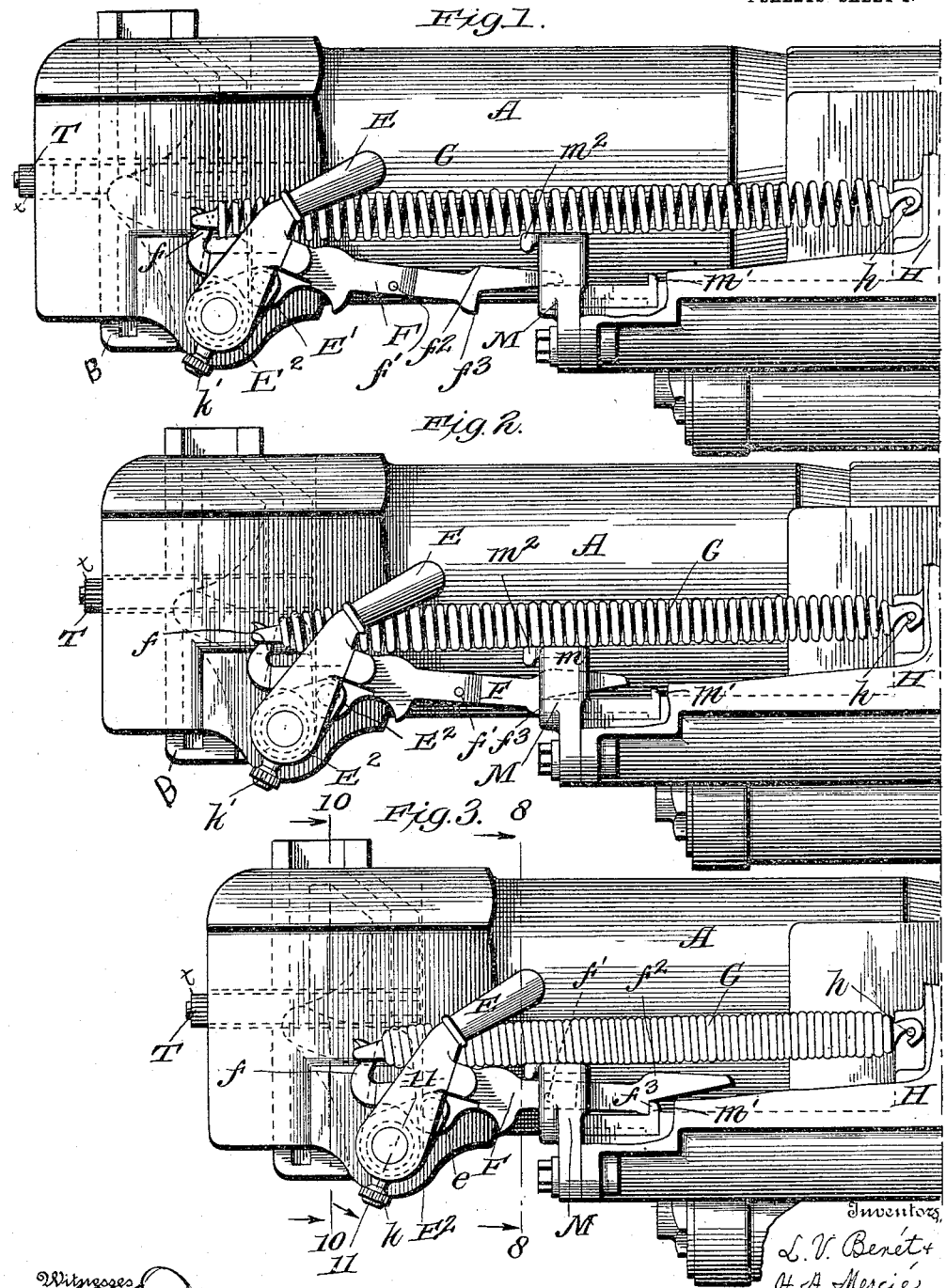

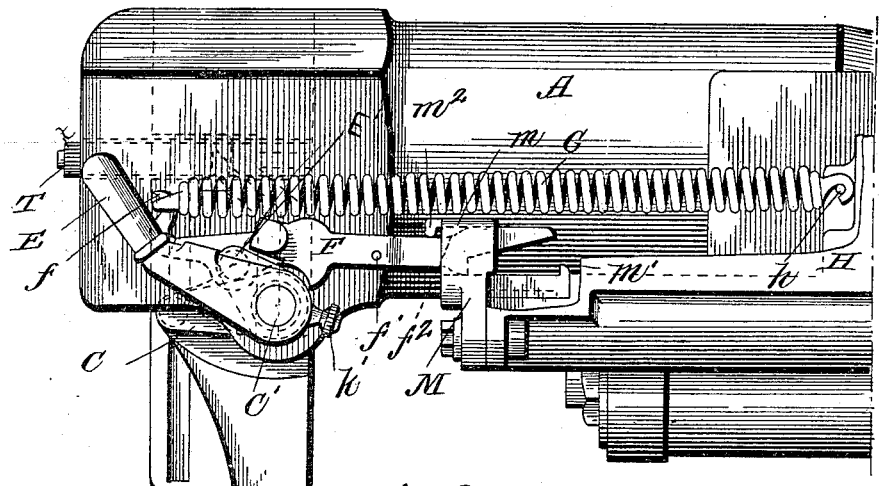
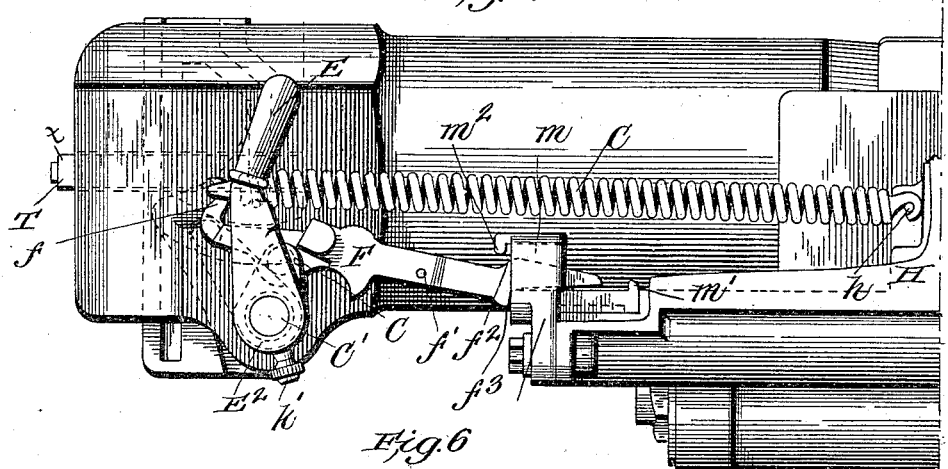
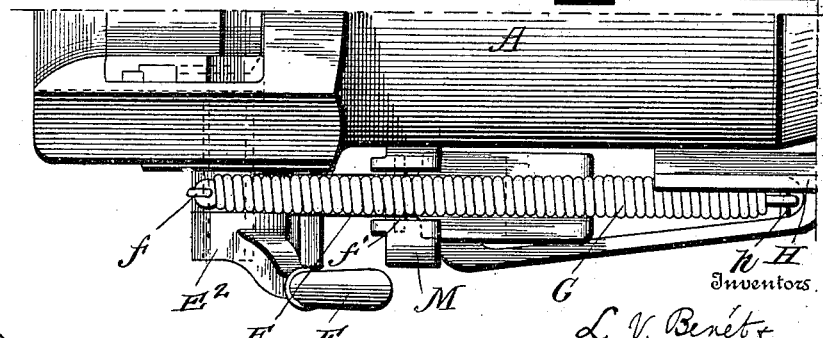

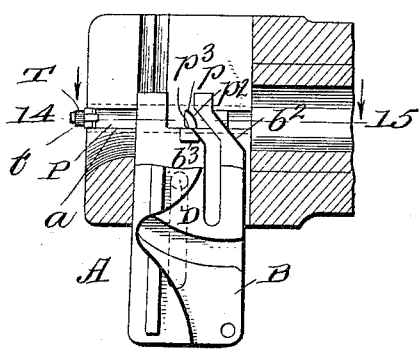
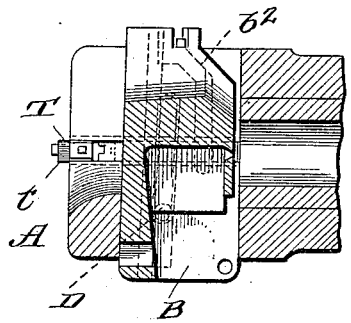
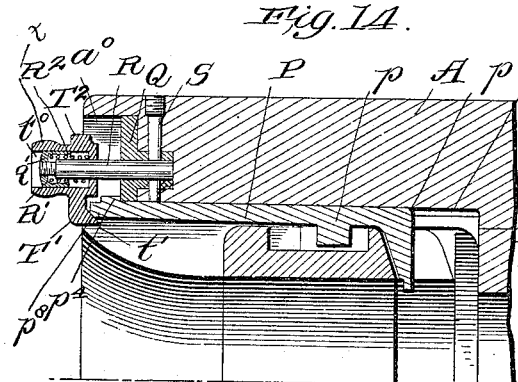
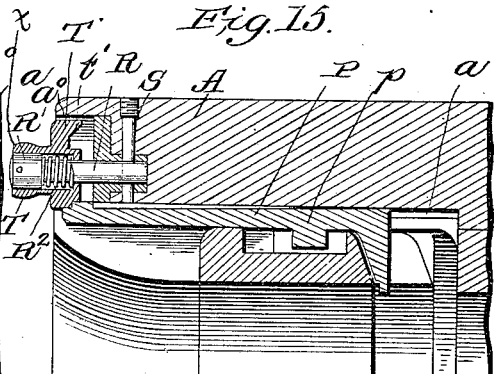
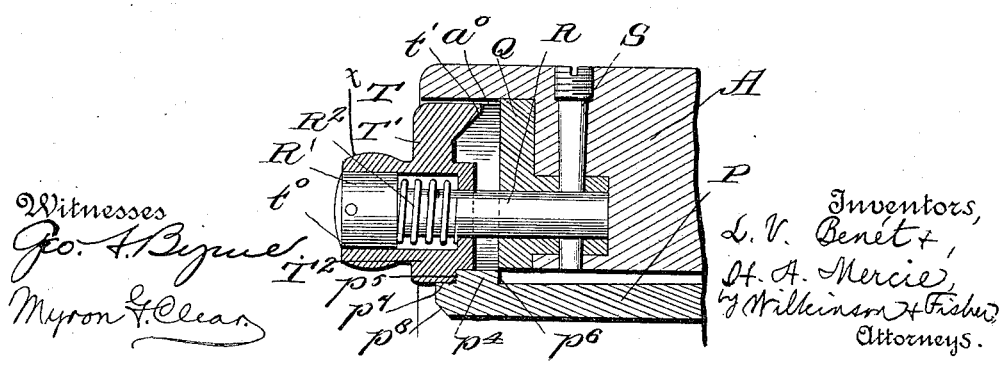

UNITED STATES PATENT OFFICE.

LAURENCE V. BENÉT AND HENRI A. MERCIÉ, OF PARIS, FRANCE.

SEMI-AUTOMATIC GUN.

No. 852,253.　　　　Specification of Letters Patent.　　　Patented April 30, 1907.

Application filed December 29, 1906. Serial No. 350,012.

*To all whom it may concern:*

Be it known that we, LAURENCE V. BENÉT, a citizen of the United States, and HENRI A. MERCIÉ, a citizen of the French Republic, both residing at Paris, France, have invented certain new and useful Improvements in Semi-Automatic Guns; and we do hereby declare the following to be a full, clear, and exact description of the invention, such as will enable others skilled in the art to which it appertains to make and use the same.

Our present invention relates to improvements in semi-automatic guns, and is intended to provide means for operating the gun either semi-automatically or wholly by hand, or to open only semi-automatically, and to close by hand; with means for rapidly shifting the mechanism from the automatic to the hand operation, or vice versa.

The invention also includes means for causing the extractor to act as an automatic stop for the breech mechanism until a fresh cartridge case is inserted; or to enable the extractor to be used in the ordinary way in the hand operation of the gun, with means for promptly adjusting the operation of the extractor, as will be hereinafter described and claimed.

Our present invention is especially intended to provide certain improvements on the structures shown in our United States patents, Nos. 649,393, granted May 8, 1900, and 696,851, granted April 1st, 1902, both entitled improvements in semi-automatic guns.

Our invention will be understood by reference to the accompanying drawings, in which the same parts are indicated by the same letters throughout the several views.

Figures 1 to 5 are side elevations showing different positions of the mechanism. Fig. 6 is a plan view of the right side of the gun, the parts being in the position shown in Fig. 3. Fig. 7 is a side elevation representing the breech mechanism in the position taken when it is operated entirely by hand. Fig. 8 shows a cross section along the line 8—8 of Fig. 3, parts being omitted. Fig. 9 is a rear elevation of the gun as seen from the left of Fig. 1. Fig. 10 shows a cross section through the breech of the gun. Fig. 11 is a detail showing the spring latch for locking the hand lever to the crank-shaft, the section being taken along the line 11—11 of Fig. 3. Fig. 12 is a vertical section through the breech, showing the breech block down. Fig. 13 is a similar section, showing the breech block up, and Figs. 14 and 15 show sections through the extractor along the line 14—15 of Fig. 12, and looking down, but with the extractor controlling block in two different positions. Figs. 11, 14 and 15 are on a larger scale than are the other figures. Fig. 16 shows parts of Fig. 15 on a still larger scale.

The gun A is shown as fitted with the breech block B of the well known Hotchkiss type, and this breech block is caused to move up and down in the breech of the gun by means of the crank-stud C driven from the crank-shaft C', as is well known in the art. The downward motion of the breech block is arrested either by the extractor, as will be hereinafter described, or by the well known stop D, see Fig. 10. This crank-shaft C' is rocked either by the hand lever E, or by the arm E' connected to the hub $E^2$ of said hand lever, and also normally connected to the sliding bar F of the semi-automatic gear, by a lug $e$, which engages a hole drilled in said bar F. This bar F is provided with a hook $f$, to which the breech closing spring G is connected, the other end of said spring being attached to the cradle H, as at $h$, and the spring being normally under tension.

The hub $E^2$ of the hand lever is connected to the crank-shaft C' by means of the spring latch K, which is normally pressed into engagement by the spring $k$, which may be withdrawn out of engagement by means of the knurled head $k'$, as shown most clearly in Fig. 11.

It will be seen that the hand lever E may be uncoupled from the crank shaft C' by withdrawing the latch K and then sliding the hub $E^2$ outward on the crank shaft C' until the said latch fails to register with the notch in the crank shaft, shown in Fig. 11, and the hand crank E will then be free to turn on the crank shaft C'. A slight further outward movement of the hub $E^2$ will disengage the lug $e$ from the hole in the rod F, and if the breech block be in the closed position, the rod F will then be drawn up into the position shown in Fig. 7, by means of the spring G. Now if the hub $E^2$ be slipped back until the latch K snaps into engagement with the notch in the shaft C', the breech mechanism may be operated entirely by hand, the semi-automatic attachment being held clear of the arm E'.

To prevent the bar F from being drawn upward too high by the spring G, when the semi-automatic gear is thrown out of engagement, as shown in Fig. 7, a stop pin $f'$ is provided which engages beneath shoulders $m$ of the slotted stop piece M. This stop piece is further provided with a stop $m'$ to prevent the bar F from being thrown forward too far, the action of which stop is illustrated in Figs. 3 and 7.

The bar F is provided with a boss $f^2$ and an abutting shoulder $f^3$ near its forward end, which boss $f^2$ strikes the lug $m^2$ on the stop piece M as the gun recoils, while on counter-recoil the shoulder $f^3$ engages the face of this stop piece M, causing the further forward movement of the gun on counter-recoil to rock the arm E' and with it the crank-shaft C' to the position for opening the breech, provided, of course, the semi-automatic gear is in the operative position.

When the semi-automatic gear is not in the operative position, or as shown in Fig. 7, the gun may move freely on recoil, or counter-recoil, without affecting the position of the parts of the bar F and of the spring G, from that shown in Fig. 7.

The extractor mechanism is somewhat similar to that shown in our patent, No. 649,393, already referred to, but there are certain differences of construction, which will now be described.

The extractor mechanism co-acting with the breech block is shown most clearly in Figs. 9, 10, and 12 to 15, in which P represents the extractor having the usual claw, see Figs. 14 and 15, which extractor is also provided with a lug $p$ having a cam face $p^2$ adapted to engage the cam face $b^2$ of the breech block, and also provided with a holding bottom face $p^3$, adapted to engage the shoulder $b^3$ on the breech block, as fully described in our patent, No. 649,393 aforesaid. Near its heel, the extractor is provided with a second lug $p^4$ having shoulders $p^5$ and $p^6$. The heel of the extractor is also provided with a flat bearing face $p^7$ and with a tapered bearing face $p^8$, as shown most clearly in Figs. 14, 15 and 16. The extractors slide in suitable grooves $a$ in the breech of the gun.

The side wall of the gun is chambered at the breech, as at $a^0$, see Figs. 14, 15 and 16, and in this chamber the socket piece Q is mounted, which receives the pin R, which, with the socket piece, is held in place by the lock pin S. This pin R is provided with a screw cap R', beneath which engages the spring $R^2$, which spring and cap fit in the recess $t^0$ in the extractor controlling block T. This block has a knurled head $t$, and two arms T' and $T^2$, which arms fit in a corresponding groove in the socket piece Q, and the block T may be drawn to the rear and turned through 180 degrees, and then allowed to snap back into engagement with the socket piece, under the action of the spring $R^2$. The two positions of this block T are shown in Figs. 14 and 15.

The arm T' has a cam face $t'$, adapted to engage in the inclined face $p^8$ of the extractor, as shown in Fig. 14, while the arm $T^2$ engages the flat face $p^7$ of the extractor, as shown in Fig. 15 and 16.

It will be noted that with the parts in the position shown in Fig. 14, the extractor will be prevented, by the lug $p^4$, from sliding forward, unless the blow on the cam of the extractor is of sufficient force to rock the extractor about the point $p^0$, causing the tail of the extractor to swing outward with sufficient force to wedge the cam $t'$ of the block T back against the action of the spring $R^2$, and disengaging the lug $p^4$ from the corresponding face of the socket piece Q.

In the ordinary operation of the gun semi-automatically, the fresh ammunition would be loaded with sufficient force to effect the rocking of the extractor, just referred to, and after the lug $p^4$ is clear of engagement, the extractor would slide forward releasing the face $p^3$ from engagement with the shoulder $b^3$, and allowing the semi-automatic gear to restore the breech block to the closed position. After the gun has been fired and the breech is opened again, the extractor will be cammed back to the position shown in Fig. 14. If, on the other hand, it is desired to operate the gun entirely by hand, the extractor controlling block may be rotated to the position shown in Figs. 15 and 16, in which case the lug $p^4$ will be held clear of engagement with the socket piece by the action of the spring $R^2$, and the extractor is free to slide backward and forward in the grooves $a$ in the gun. Thus it will be seen that the extractor may be quickly adjusted for locking the breech down, as in semi-automatic operation, or it may be adjusted to slide freely in its guides, by simply drawing back of the block T and rotating said block 180 degrees, when the block will be snapped to the engaging position by the spring $R^2$.

The operation of the device is as follows. Suppose it is desired to operate the gun semi-automatically. Turn the extractor controlling block to the position shown in Fig. 14, and see that the bar F is in engagement with the arm E', and the hand lever E is locked to the crank-shaft C'. Now suppose the gun, being already loaded, to be fired. As the gun recoils, the bar F will swing down to the position shown in Fig. 1, and when the gun goes forward on counter-recoil, the shoulder $f^3$ will engage the face of the stop piece M, rocking the crank-shaft C' against the action of the spring G, and opening the breech. The breech block in opening will cam the extractor backward to the position shown in Fig. 14, and the slight upward movement of the breech block, provided for in the mechanism of the type referred to, will cause the face $p^3$ of the lug $p$ of the extractor to engage the shoulder $b^3$ of the breech block, and hold said block down until the extractor is moved forward by the insertion of fresh ammunition, as already described. Should, from any cause, the spring G carry away, or be omitted, the lug $m^2$ would still strike the boss $f^2$, and would push the front end of the bar F down, causing the shoulder $f^3$ to engage the stop M on counter-recoil, as shown in Fig. 2, and thus the breech would be opened semi-automatically without any action of the spring G, and the breech could be closed by hand by simply turning the hand lever in the usual way. To throw the automatic gear out of action, and operate wholly by hand, it will only be necessary to withdraw the latch K far enough to release the hand lever from engagement with the crank-shaft C', and then to draw the bar F out of engagement with the lug $e$, the parts then assuming the position shown in Fig. 7. At the same time, shift the extractor controlling block T from the position shown in Fig. 14 to that shown in Figs. 15 and 16. To put the automatic gear in operation again, reverse the procedure.

It will thus be seen that the herein described device may be used either to open and close the breech semi-automatically, or to open the breech semi-automatically and close it by hand, or to operate the breech mechanism entirely by hand; and also that the extractor may be readily shifted from the position for semi-automatic closure of the breech to that for hand closure.

It will be obvious that various modifications might be made in the herein described apparatus which could be used without departing from the spirit of our invention.

Having thus described our invention, what we claim and desire to secure by Letters Patent of the United States, is:—

1. In a recoil mount, the combination of a crank-shaft and mechanism operated thereby for opening and closing the breech, of a hand-lever and an arm detachably connected to said crank-shaft, and an operating bar detachably connected to said arm and adapted to engage a non-recoiling part of the mount on counter-recoil of the gun, said bar being provided with a boss on the upper portion thereof, and a stop block secured to a non-recoiling part of the mount and adapted to engage said bar on counter-recoil, and also provided with a lug adapted to engage said boss and to throw the end of the bar downward on recoil, substantially as described.

2. In a recoil mount, the combination of a crank-shaft and mechanism operated thereby for opening and closing the breech, of a hand lever and an arm detachably connected to said crank-shaft, and an operating bar detachably connected to said arm and adapted to engage a non-recoiling part of the mount on counter-recoil of the gun, said bar being provided with a boss on the upper portion thereof, a spring under tension connecting said operating bar and a non-recoiling portion of the mount, and a stop block secured to a non-recoiling part of the mount and adapted to engage said bar on counter-recoil, and also provided with a lug adapted to engage said boss and to throw the end of the bar downward on recoil, substantially as described.

3. The combination of a cradle and a gun mounted therein, of a reciprocating breech block, semi-automatic mechanism for automatically reciprocating said breech block, a sliding extractor operated by said breech block on opening and adapted to automatically lock said breech block in the open position, a lug on the heel of the extractor adapted to engage a fixed part of the gun body, and an extractor controlling block adapted to throw said lug into or out of engagement, substantially as described.

4. The combination with a cradle and a gun mounted therein, of a reciprocating breech block, semi-automatic mechanism for automatically reciprocating said breech block, a sliding extractor operated by said breech block on opening and adapted to automatically lock said breech block in the open position, a lug on the heel of the extractor adapted to engage a fixed part of the gun body, and a reversible spring impressed extractor controlling block adapted to throw said lug into or out of engagement, substantially as described.

5. The combination of a cradle and a gun mounted therein, of a reciprocating breech block, means for reciprocating said breech block, a sliding extractor operated by said breech block on opening and adapted to automatically lock said breech block in the open position, a lug on the heel of the extractor adapted to engage a fixed part of the gun body, and a reversible extractor controlling block adapted to throw said lug into or out of engagement, substantially as described.

6. The combination with a cradle and a gun mounted therein, of a reciprocating breech block, means for reciprocating said breech block, a sliding extractor operated by said breech block on opening and adapted to automatically lock said breech block in the open position, a lug on the heel of the extractor adapted to engage a fixed part of the gun body, and a reversible spring impressed extractor controlling block having a locking face adapted to hold said lug out of engagement, and a wedge face adapted to hold said lug in yielding engagement with the gun body, substantially as described.

7. The combination of a cradle and a gun mounted therein, of a reciprocating breech block, means for reciprocating said breech block, both semi-automatically and by hand, a sliding extractor operated by said breech block on opening and adapted to automatically lock said breech block in the open position, a lug on the heel of the extractor adapted to engage a fixed part of the gun body, and a reversible extractor controlling block adapted to throw said lug into or out of engagement, substantially as described.

8. The combination with a cradle and a gun mounted therein, of a reciprocating breech block, means for reciprocating said breech block, both semi-automatically and by hand, a sliding extractor operated by said breech block on opening and adapted to automatically lock said breech block in the open position, the said extractor having a laterally projecting claw, with a lug on the heel of the extractor adapted to engage a fixed part of the gun body, and a reversible spring impressed extractor controlling block having a locking face adapted to hold said lug out of engagement, and a wedge face adapted to hold said lug in yielding engagement with the gun body, and to release said lug against the action of said spring when a sufficient blow is given to the claw of said extractor, substantially as described.

In testimony whereof we affix our signatures in presence of two witnesses.

LAURENCE V. BENÉT.
HENRI A. MERCIÉ.

Witnesses:
  W. H. SQUIRE,
  ALFRED CLÉRICEAN.